United States Patent Office 3,314,113
Patented Apr. 18, 1967

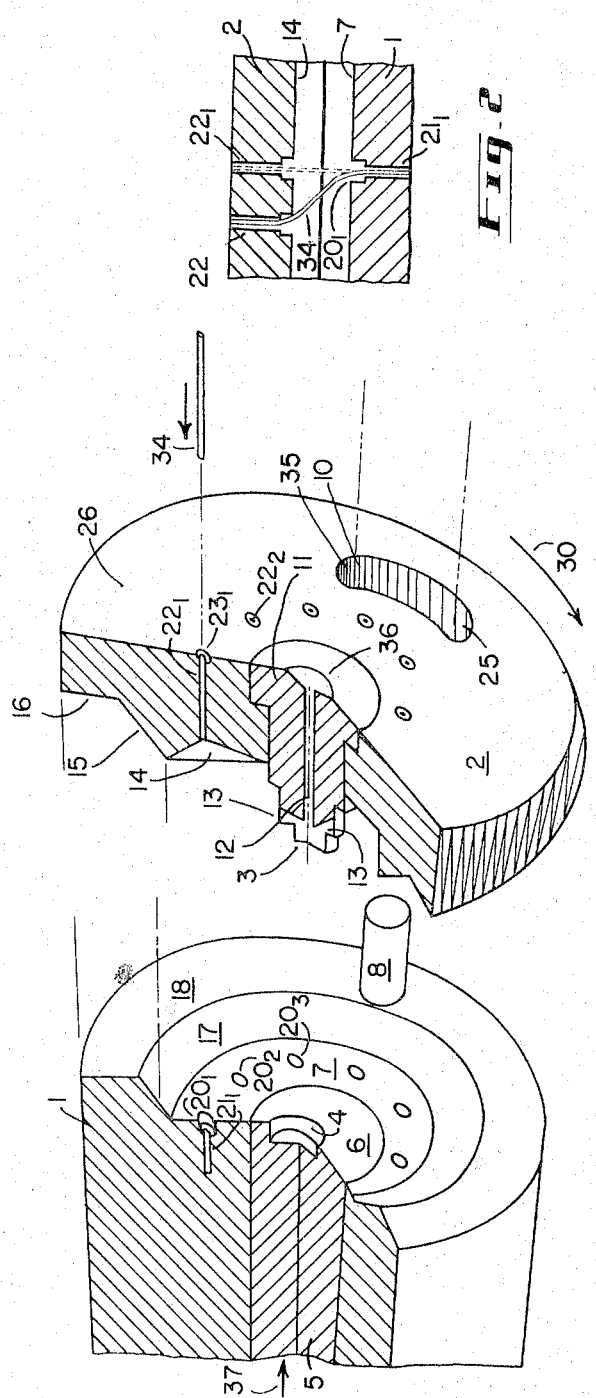

3,314,113
MOULDING METHOD AND APPARATUS
Allan C. Goodman, Ottawa, Ontario, Canada, assignor to Northern Electric Company Limited, Montreal, Quebec, Canada
Filed Apr. 15, 1964, Ser. No. 359,989
7 Claims. (Cl. 18—36)

This invention relates to a method and apparatus for fastening an elongated body into a plastic material in which there is not ordinarily sufficient bonding to the body to prevent its sliding within the plastic. More particularly the invention relates to a method and apparatus for fastening electrical conductor wires into a plastic material in which the material is moulded around the wires.

The invention finds especial application where it is desired to bring a plurality of conductors to a terminal block or plate of a thermoplastic material which does not have good adhesive properties.

More particularly in accordance with the invention there is provided apparatus for moulding a straight elongated body having a surface to which solidified moulding material will not adhere adequately and for rendering the body fast within such moulding material which comprises, a mould comprising two portions relatively assemblable to define a mould cavity and including an inlet channel for the introduction of liquid moulding material into the cavity, means for accommodating said straight elongated body within the mould and including a tunnel defined in one said portion, and a socket defined in the second portion, alignable with the tunnel, and means permitting relative movement between said one portion of said mould and said second portion of said mould while said elongated body is positioned in said tunnel and said socket for kinking said elongated body, said body thereby being fast within said moulding material after solidification.

In accordance with the invention there is also provided the method of attaching an elongated body within solidified moulding material to which the surface of said body will not adhere adequately which comprises the steps of, passing said body across a cavity defined in a mould for said material from a first portion of said mould into a second portion, moving said first and said second portions relatively to one another to kink said body, introducing liquid moulding material into said mould, allowing said material to solidify and ejecting said solidified material with said body contained therein from said mould.

In a preferred form, the mould comprises a block and a cap portion, and includes a stop for limiting relative rotation between the block and the cap. An ejector pin may also be provided for removing solidified material from the mould cavity.

A description of the invention will now be made with reference to the accompanying drawings in which, FIGURE 1 is an exploded view partly in section of a mould for forming plastic material around a plurality of wires, and FIGURE 2 is a view sectioned through the mould showing the kink offset introduced in the wires during processing.

The mould comprises two parts, a block portion 1 and a cap portion 2 which can be assembled so that a projection 3 on the cap is received in the recess 4 of a pin 5 accommodated in the block 1. Pin 5 is used for ejection of the finished product and is normally arranged so that its end surface 6 is flush with the floor 7 of the mould chamber in block 1. Also mounted on block 1 is a pin 8 which can be received in slot 10 of cap 2. The projection 3 forms part of a stud 11 in the cap 2. Liquid plastic material, for instance a thermoplastic, can be run into the mould through a channel 12 in the stud and squirts out of orifices 13 into the mould cavity formed between floor 7 and vault 14 in the cap. Surfaces 15 and 16 of the cap co-operate respectively with surfaces 17 and 18 of the block 1.

Formed within the floor 7 are recesses $20_1$, $20_2$, etc. leading to sockets $21_1$, $22_2$ etc. and in the vault 14 are a series of tunnels $22_1$, $22_2$ etc. for the receipt of wires. When the block 1 and cap 2 are aligned so that a straight piece of wire inserted into the outer end $23_1$ of tunnel $22_1$ will pass directly across the mould cavity space between floor 7 and vault 14 and be accommodated in socket $21_1$, the remaining tunnels and sockets are also aligned so that straight wires inserted into them will line up between one and the corresponding other. This alignment of sockets and tunnels is obtained with the pin 8 at one end of the slot 10. In the position shown in FIGURE 1 it would be at the end 25 of the slot.

The wires may then, if desired, be cut off flush with the surface 26 of cap 2 or a suitable length be left for connecting purposes. The cap is then rotated in the direction of arrow 30 so that pin 8 comes to rest against end 35 of slot 10 and a wire 34 is bent so that it takes up the kinked offset position shown in FIGURE 2.

The liquid plastic material is injected into channel 12 by placing a nozzle (not shown) in the cup shaped orifice 36 from whence it passes into and fills the mould cavity. It is allowed to solidify, and the casting with its contained wires is then ejected from the mould by removing cap 2 and operating pin 5 in the direction shown by arrow 37.

Further castings can be made by returning the pin to its original position, replacing the cap, bringing up further wires, and passing in more plastic material.

In an alternative embodiment the sockets 21 may be extended right through block 1 so that the wires can be of any length desired and will not be limited by the bottom ends of the sockets as shown in FIGURE 1.

While I have shown one way in which single articles may be moulded, a multiple cavity mould (with interconnected cavities) could be constructed using movable caps for each cavity. In a straight line mould such as used in fabricating a terminal block of elongated form, the cap portion could be made to slide across the face of the block portion to provide the necessary kink in the wires rather than to rotate about its axis as shown here. A cooperating key mounted in either the cap or block and running in a slot in the other would ensure alignment of cap and block and would limit the travel of one across the other.

I claim:
1. Apparatus for moulding a straight elongated body having a surface to which solidified moulding material will not adhere adequately and for rendering the body fast within such moulding material which comprises:
   a mould comprising a block portion and a cap portion relatively assemblable to define a mould cavity and including an inlet channel for the introduction of liquid moulding material into the cavity, said cap portion being relatively rotatable on said block portion,
   means for accommodating said straight elongated body within the mould and including a tunnel defined in one of the portions, and a socket defined in the other portion alignable with the tunnel,
   means permitting relative rotation between said block portion and said cap portion while said elongated body is positioned in said tunnel and said socket for kinking said elongated body,
   and stop means on one of said portions engaging the other portion upon chosen relative rotation of said block and cap, said body being kinkable by relative rotation of said block and cap and thereby being fast within said moulding material after solidification.

2. Apparatus as defined in claim 1 wherein said stop means comprises a pin on said block and a cooperating slot defined in the said cap.

3. Apparatus as defined in claim 2, said channel being defined in said cap portion.

4. Apparatus as defined in claim 1, said tunnel traversing said portion within which it is defined for receiving said elongated body on the side of said portion opposite from that defining the cavity, for positioning of said body in said cavity upon movement of said body through said tunnel.

5. Apparatus as defined in claim 1 comprising an ejector pin in said block for removal of solidified moulding material from said cavity.

6. Apparatus as defined in claim 4, including a projection defined on said cap portion, a recess defined in said block portion, said recess receiving said projection for location of said cap with respect to said block, said recess and said projection permitting relative rotation of, while preventing lateral relative movement of, said block and cap.

7. Apparatus for moulding a straight elongated body having a surface to which solidified moulding material will not adhere adequately and for rendering the body fast within such moulding material which comprises;

a mould comprising a block portion and a cap portion, a projection defined on one of said portions and a recess in the other of said portions for the reception of said projections upon mutual assembly of said block and cap to define a mould cavity and for permitting relative rotation of said block and cap, an inlet channel defined in said cap for the introduction of liquid moulding material into said cavity, means for accommodating said straight elongated body within the mould and including a tunnel defined in one of said portions terminating in said cavity and alignable with a socket defined in the other of said portions terminating in said cavity and alignable with said tunnel, said tunnel being open at its end opposite to that in said cavity and permitting bringing up of said straight elongated body for crossing said cavity and reception in said socket, said body being kinkable by relative rotation of said cap and block, means restricting the extent of rotation of said cap and block said means comprising a post on one of said portions and a slot on the other of said portions for receiving said post, and an ejector pin in said block positioned for removal of solidified moulding material from said cavity and withdrawal of said elongated body from said socket, upon movement of said ejector pin.

References Cited by the Examiner

UNITED STATES PATENTS

| | | | |
|---|---|---|---|
| 2,276,380 | 3/1942 | English et al. | 18—36 |
| 2,999,276 | 9/1961 | Morin | 264—275 X |
| 3,207,832 | 9/1965 | Patti et al. | 18—36 |

ROBERT E. WHITE, *Primary Examiner.*

L. S. SQUIRES, R. B. MOFFITT, *Assistant Examiners.*